2,920,349

POLYETHYLENE FILMS

James Rushton White, Chadds Ford, Pa., assignor to E. I. du Pont de Nemours and Company, Wilmington, Del., a corporation of Delaware No Drawing. Application September 10, 1957
Serial No. 683,007

2 Claims. (Cl. 18—48)

This invention concerns fibrillatable films. More specifically, it relates to a one-step process for producing oriented films suitable for fibrillating.

It has been customary to prepare oriented films suitable for disintegration into filamentary materials by a two-step process which involves first forming an unoriented film, and orienting the film by stretching. Considerable force is required to orient a film properly by drawing, particularly since films tend to crystallize before they can be drawn. Drawing adds considerably to the expense of preparing an oriented film and the partial crystallization which usually occurs before drawing results in the formation of a film which is less oriented than desirable for many fibrillation processes. There has been a need for a process which would provide film formation and orientation substantially simultaneously in one treatment step.

One object of this invention is to provide a direct and more convenient process for preparing oriented films suitable for fibrillation. Another object of this invention is to provide oriented films from high density ethylene polymer particles without forming solutions or melts as an intermediate step in the process. Another object of this invention is to provide a one-step process for preparing oriented films directly from these polymer particles without a separate drawing step.

In accordance with this invention a substantially linear crystallizable high density ethylene polymer is formed into an oriented film in one process step. Preparation of an oriented film from the polymer particles is accomplished by subjecting them to compressive shear, as by passing them through the nip of rubber-mill rolls or the like, at a temperature between 75° C. and 135° C., preferably between 120° C. and 130° C. Clearance between the rolls of the mill is controlled so that the work done on the polymer is sufficient, at the temperature of treatment, to coalesce the polymer particles.

In a preferred embodiment of this invention, the polymer particles are passed through the nip of a pair of heated rolls, such as calender rolls or rubbermill rolls, to produce an oriented film. Clearance between the rolls is determined partly by the number of passes which the polymer is permitted to make between the rolls. This is dictated in part by the final film thickness desired. If the film is to make multiple passes, an initial clearance as high as about 20 mils is permissible although smaller clearances may be used, and, in fact, clearances below about 10 mils are preferred. When multiple passes are used, it is desirable to reduce the clearance after each pass to improve efficiency of orientation. If the film is passed through the roll only once, a maximum clearance capable of producing a satisfactory film is about 5 mils.

Calender rolls generally rotate at the same speed, and, when utilized in this invention, require somewhat smaller clearances than are permissible for a rubbermill, in which the rolls operate at different speeds. The ratio of speeds in the rubbermill can be varied over a wide range. In general, the amount of clearance between rolls may be increased as the difference in roll speeds becomes greater. However, the magnitude of this adjustment and the resulting change in the nature of the product are relatively small.

For a fixed clearance the amount of orientation introduced by the rubbermill varies as the difference in the speed of the rolls. For a given difference in roll speeds, the extent of orientation is inversely proportional to the clearance in the rolls. The orientation of the polymer particles is naturally dependent upon the process conditions and also the polymer being rolled. The process of this invention is capable of producing film with an orientation angle between about 60° and about 3°.

Orientation angle is determined from the X-ray diffraction pattern of a crystalline polymer or film. The angles are formed by drawing a line from each end of the second equatorial spot or arc in the diffraction pattern to the center of the pattern.

Ethylene polymers operable in this process must be substantially linear and crystallizable, must flow and coalesce at a temperature below the crystalline melting point, and must have a suitably high density. The term "substantially linear," as used here, is intended to include ethylene polymers having a density at 25° C. of at least 0.945 and preferably at least 0.950. Cross-linked or three-dimensional polymer structures are excluded. It is intended to include branched-chain polymers, although the highly branched polymers are somewhat less desirable. The term "ethylene polymers" is intended to include copolymers of ethylene and other ethylenically unsaturated monomers which possess suitable densities.

Following is a test which has been devised to establish suitable operating conditions without requiring actual production of a film. Polymer powder or granules (0.5 gram), preferably below 10 mils in diameter, are placed in a ¾ inch diameter mold cavity and pressed for one minute at room temperature and 2000 lbs./sq. in. to produce a wafer of polymer. This wafer is placed in a press and heated without pressing for two minutes at a chosen temperature and then pressed for one minute. The pressure at which the wafer increases in diameter by at least about 13% is the minimum pressure desirable with the particular polymer at this temperature. If the pressure required to do this is undesirably high for the equipment which is to be used, a higher temperature may be selected and the test repeated to establish the required pressure.

This measurement establishes the polymer flow characteristic. Coalesceability is determined by observing that the pressed film becomes transparent or at least translucent at some temperature below the crystalline melting point. Linear polyethylene was found to show a diameter increase of 140% under a pressure of 12,000 p.s.i. at 120° C.

In producing oriented films by the process of this invention, the polymer is usually milled at a temperature between the crystalline melting point of the polymer and the temperature at which the polymer becomes clear or translucent in the above test. It is preferable to operate approximately in the middle of this temperature range. Use of a plasticized polymer lowers the operating temperature and increases the ease of operation. Polymer particles suitable for use in the process can be prepared by a slurry polymerization process or by crystallization or precipitation from a solvent. Since one of the objectives of this process is to avoid the use of solvents, the first method would usually be preferred.

Crystalline melting point is a property of polymers determined with the aid of X-rays. It is the temperature at which crystalline polymer is in equilibrium with liquid polymer. At a temperature slightly above this the crystals disappear and the polymer becomes completely liquid.

The product of this invention is a coalesced, translucent or transparent oriented film. Film sheets are oriented in the direction of roll and, as mentioned previously, have orientation angles below about 60°. In some instances, the properties of the sheet and the orientation can be further improved by drawing. The films produced by rolling are used primarily for the production of fibrillar products, and the type of fibrils obtained depends upon the conditions used. If oriented films are rubbed transversely, it is possible to obtain long monofilaments. If the rubbing, twisting, or grinding action is made more severe, these filamentary products tend to become like staple. Use of a hammermill produces rhomboidal fibrils with flagellae.

These fibrillar products are particularly useful for preparing molded objects with high impact strength. The data given in Example II are typical of the improvement obtained in the properties of molded objects when they are prepared from the fibrils of this invention rather than from conventional molding powders. The products obtained are also better than those obtained when conventional staple is used. The round cross sections of the conventional staple require higher compressive forces to produce a satisfactory molded object. Even then, the adhesion and compactness of the final structure are usually poorer. There are circumstances, however, under which there is an advantage to using mixtures of these fibrils with minor amounts of polymer powders or staple. Mixtures of fibrils from different polymers are also useful.

Laminated sheets can also be prepared from these fibrils. If desired, the layers can be placed with the orientation of the fibrils at right angles to provide isotropic laminates.

The following examples illustrate specific embodiments of the invention. All parts and percentages are by weight unless otherwise indicated.

Example I

Powdered linear polyethylene with a melt index of 0 is formed into an oriented film by passing it once at a temperature of about 110° C. through the rolls of a rubbermill set about 5 mils apart. The steel rolls of the mill are six inches in diameter and the polymer powder is confined between brass dams placed two inches apart. The rolls are operating at different speeds, with the surface of the fast roll moving at a linear velocity of approximately 27 ft./min. and the surface of the slow roll moving at a linear velocity of approximately 21½ ft./min. A fibrillatable film having an orientation angle of 18° is obtained.

Example II

Linear polyethylene powder with a melt index of 0 is heated to 128° C. and passed once through the rubbermill of Example I with the mill operating under the same conditions. The film obtained, which has an orientation angle of 18°, is passed through a cooled hammermill to produce fibrils up to ½ inch in length and averaging approximately 0.3 mil in diameter. These fibrils are placed in a mold and heated for two minutes at 1,000 p.s.i. and 140° C. The bars obtained have izod impact strengths of 12.7 ft. lbs./in. notch as measured by A.S.T.M. D256–47T.

Example III

A ready fibrillatable film is obtained by milling linear polyethylene particles with a melt index of 0.62 at 120° C., using the same milling conditions described in the first example.

Example IV

Linear polyethylene with a melt index of 0.2 is rubbermilled at 125° C., using the same mill settings described in the first example. One pass of the polymer through the mill produces a sheet 4.4 mils thick. A $\frac{1}{16}$ inch strip is cut in a direction of rolling and drawn 5X in the same direction by passing near a pin heated at 135° C. The film has an orientation angle of 4°.

Melt index is determined by placing polyethylene polymers in a cylinder with a bore of $0.3760\pm0.0003$ inch with an orifice $0.0825\pm0.0002$ inch in diameter and $0.315\pm0.001$ inch in length at the lower end. The polyethylene is heated to $190°\pm0.4°$ C. and a weighted piston $0.3730\pm0.003$ inch in diameter and a $0.250\pm0.005$ inch in length and weighing $2160\pm10$ grams is placed in the cylinder above the polyethylene. The extrudate obtained in the first few minutes of operation is discarded and the additional extrudate timed and weighed. Melt index is the rate of extrusion measured in grams per 10 minutes of operation.

The claimed invention:

1. A process which comprises subjecting a substantially linear crystallizable ethylene polymer, in particle form and having a density at 25° C. of at least 0.945, to sufficient compressive shear in a single direction at a temperature between about 75° C. and about 135° C. to coalesce the polymer, and fibrillating the film by applying force thereto in a direction transverse to the direction of application of shear.

2. The process of claim 1 in which the temperature is between about 120° C. and about 130° C.

References Cited in the file of this patent

UNITED STATES PATENTS

| 2,185,789 | Jacque | Jan. 2, 1940 |
| 2,631,954 | Bright | Mar. 17, 1953 |
| 2,707,805 | Smith et al. | May 10, 1955 |

FOREIGN PATENTS

| 502,597 | Canada | May 18, 1954 |
| 510,145 | Canada | Feb. 15, 1955 |